United States Patent
Rissler

[19]

[11] Patent Number: 6,036,409

[45] Date of Patent: Mar. 14, 2000

[54] BLIND HOLE SELF-COLLET COUNTERSINK

[75] Inventor: Lawrence D. Rissler, Sumner, Wash.

[73] Assignee: The Boeing Company, Seattle, Wash.

[21] Appl. No.: 08/788,727

[22] Filed: Jan. 23, 1997

[51] Int. Cl.[7] ........................... B23B 45/04; B23B 45/14; B23B 47/22; B23B 51/08

[52] U.S. Cl. ........................... 408/72 R; 408/82; 408/93; 408/111; 408/130; 408/702

[58] Field of Search .................. 408/72 R, 93, 408/94, 110–112, 80–82, 130, 702

[56] References Cited

U.S. PATENT DOCUMENTS

| | | | |
|---|---|---|---|
| 2,665,597 | 1/1954 | Hill | 408/93 |
| 2,669,887 | 2/1954 | Rees | 408/94 |
| 2,706,917 | 4/1955 | Hill | 408/94 |
| 3,037,401 | 6/1962 | Rees | 408/93 |

*Primary Examiner*—Steven C. Bishop
*Attorney, Agent, or Firm*—Bernard A. Donahue

[57] ABSTRACT

This invention is a portable pneumatic cutter tool for cutting countersinks into a workpiece 17 having pre-drilled holes 15. When pressure is applied, a piston return cylinder 57 and a feed rate cylinder 79 are also pressurized, which sets a body piston 72 and spindle piston 80 reacts against a spindle bar 82 which holds nose 94 in its outer-most limit position. A pistol grip drill 44 drives a geared belt 34 to cut the countersink after actuation by trigger 45. A flare tube shaft 14 expands a multiple finger and pad arrangement of a collet 12 to provide clamp-up on the back side of workpiece 17. Clamp-up on the front side of workpiece 17 is provided by pneumatic pressure and solid mechanical stops 16. The countersink cutter 18 advances into workpiece 17, reaching its depth, and returns automatically to its start position.

2 Claims, 3 Drawing Sheets

BLIND HOLE SELF-COLLET COUNTERSINK

BACKGROUND OF THE INVENTION

1. Field of the Invention

The present invention relates to an apparatus and method for countersinking, counterboring, or spotfacing of holes in metal or composite materials.

2. Background Information

The standard method of countersinking large diameter holes in aircraft manufacturing operations is basically a two step operation. Close tolerance holes are drilled through both workpieces. A power tool is attached to the hole nearest the one being countersunk. This attachment to the nearest hole is the reason that only 90% depth can be achieved. Because of push away forces at the cutter, the depth cannot be controlled accurately. The second step is performed using a hand held pistol grip drill motor with a microstop countersink cage. The countersink depth is significantly influenced by inconsistencies of operation between workers. Countersinking of large diameter holes in graphite epoxy and other materials is particularly labor intensive and the depth control is inconsistent. The tolerances for surface flushness of 100 degree countersink fasteners is −0.005 to +0.002 inches because of aerodynamic considerations.

The U.S. Pat. No. 3,037,401 to Rees (hereinafter the '401 system) describes an invention that attaches to the nose piece of U.S. Pat. No. 2,669,887 to Rees (hereinafter the '887 system). The '401 system allows the '887 system to rotate more easily into predrilled holes with angularity from the workpiece surface. This countersink angular rotation to hole is a major problem with countersink fasteners. When a fastener flat head is not perpendicular within allowed tolerances it is in rejectable condition. The '401 system allows a high degree of variability to workpiece surface perpendicularity of a hole and thereby would be excluded from use in countersinking by some manufacturers.

The '887 system appears to have a number of problems not present in Applicant's invention. Single point backside workpiece contact by locking element 51 (see FIG. 8 in '887) could damage the workpiece because of forces involved with the attachment and countersinking operations. Toot power trigger 36 is activated and then hand control lever 69 needs to be operated. This is a multiple operation adding time to countersinking. (See FIG. 2). A pre-drilled hole may not be in the correct angularity to the workpiece. Current requirements are not to exceed 2 degrees. Countersinking in line with such a pre-drilled hole can cause the fastener head to be tipped (See FIG. 3). Tubular mandrel 37 is used for aligning the countersink to hole would need to be of sufficient length (as shown in the system '401 FIG. 3) to incorporate both pieces of a workpiece thereby limiting the workpiece minimum thickness. (See FIG. 3) Countersink speed rate is controlled by 3 hydraulic cylinders 78 in the '887 system tied together by supply lines 88, 89, 90, 91, and valves 92, 94. Any piston seal leakage or supply line restriction would result in misalignment in the countersink. (See FIGS. 12 and 16 of '887). Gear drive 29 requires a sealed casing to retain lubricant greases thereby adding to the equipment weight and costs. If a seal were worn the lubricant could contaminate the workpiece. Piston mechanism 45 and 46 is a complicated mechanism that could be prone to wear or failure. The close tolerance tubular mandrel 37 could be difficult to insert and extract from holes that have a close diameter tolerance range. If a hole was at its largest tolerance range, a rocking of the mandrel could cause angularity problems or if the hole was at its smallest tolerance range the mandrel could be difficult to fit. (See FIG. 3 of '887).

SUMMARY OF THE INVENTION

Aspects of the tool of this invention (which will hereinafter often be referred to as the "tool" or applicant's "tool") include the following. Countersinking holes in today's close tolerance environment is a labor intensive and time consuming process. The one step tool of applicant attaches to the same hole as it is countersinking and decreases the time to perform the countersink operation thereby reducing the labor and cost of countersinking. This tool also produces a countersink which is perpendicular to the workpiece surface and the depth control is held to a great degree of accuracy. The costs of manufacturing with this tool are held to a minimum due to the reproducibility inherent to its design. Clamp-up is by a multiple finger and pad arrangement which equalizes the forces required to hold the tool and perform the countersinking operation. Depth consistency is accomplished by solid mechanical stops. These tools can be used in most materials and each tool will produce substantially identical parts.

Aspects of this invention that are valuable and are not present in the '887 patent discussed in the previous section, include the following: the external expanding collet 12 provides six finger pads spread equally around the hole. This disperses the force so that no damage will accrue to the back side of the workpiece. One pull of the tool power trigger starts the entire countersinking operation. This tool will countersink perpendicular to the workpiece despite any misalignment of the pre-drilled hole. The three hydraulic cylinders of the '887 system must bleed simultaneously to control countersink feed rate. Applicant's tool would appear to be simpler, with only one pneumatic cylinder and valve used in accomplishing the same purpose. The flare tube aligns to the back side of the workpiece and is not a thickness limiting factor, because of a 0.060 of an inch backside workpiece interface. The cylinder bleed valve controls countersink speed rate. Applicant's tool is much simpler. The belt drive is a reliable means of transmitting power and is easily replaceable. The single action piston is much simpler and has improved wear and failure characteristics. The flare tube has a small contact area with the workpiece whereby little friction is involved with the insertion or extraction of this tool.

BRIEF DESCRIPTION OF THE DRAWINGS

The foregoing aspects and many of the attendant advantages of this invention will become more readily appreciated as the same becomes better understood by reference to the following detailed description when taken in conjunction with the accompanying drawings, wherein.

DETAILED DESCRIPTION OF A PREFERRED EMBODIMENT

Figure 1:
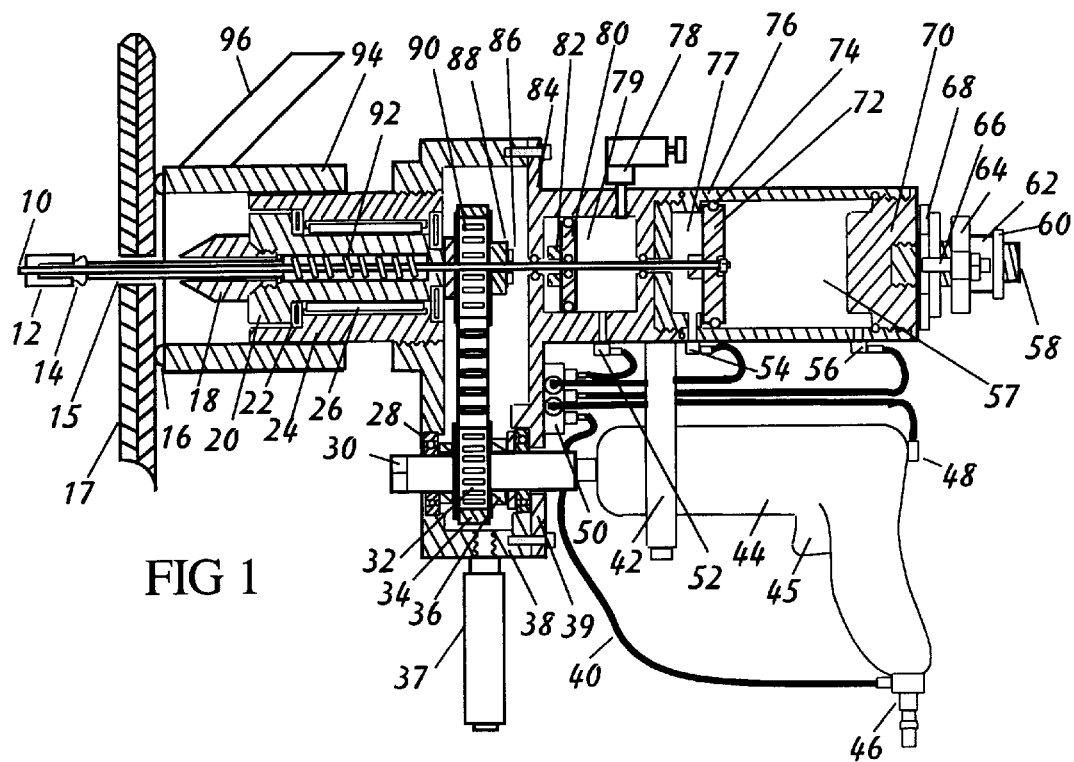
FIG. 1 is a sectional side view showing the tool at the beginning of the countersinking operation.

Referring to FIG. 1, a sectional side view of the tool is shown. When the air supply line is attached to an air supply fitting 46 the pneumatic supply line 40 activates the air splicer block 50 and supplies air pressure to air supply fitting 52 and air supply fitting 56. The piston return cylinder 57 and feed rate cylinder 79 are now pressurized, which sets both body piston 72 and spindle piston 80 into their start positions. Spindle piston 80 reacts against spindle bar 82 which is attached to nose 94 and holds nose 94 at its outermost limit. This has clamped the tool to the workpiece 17.

Figure 2:
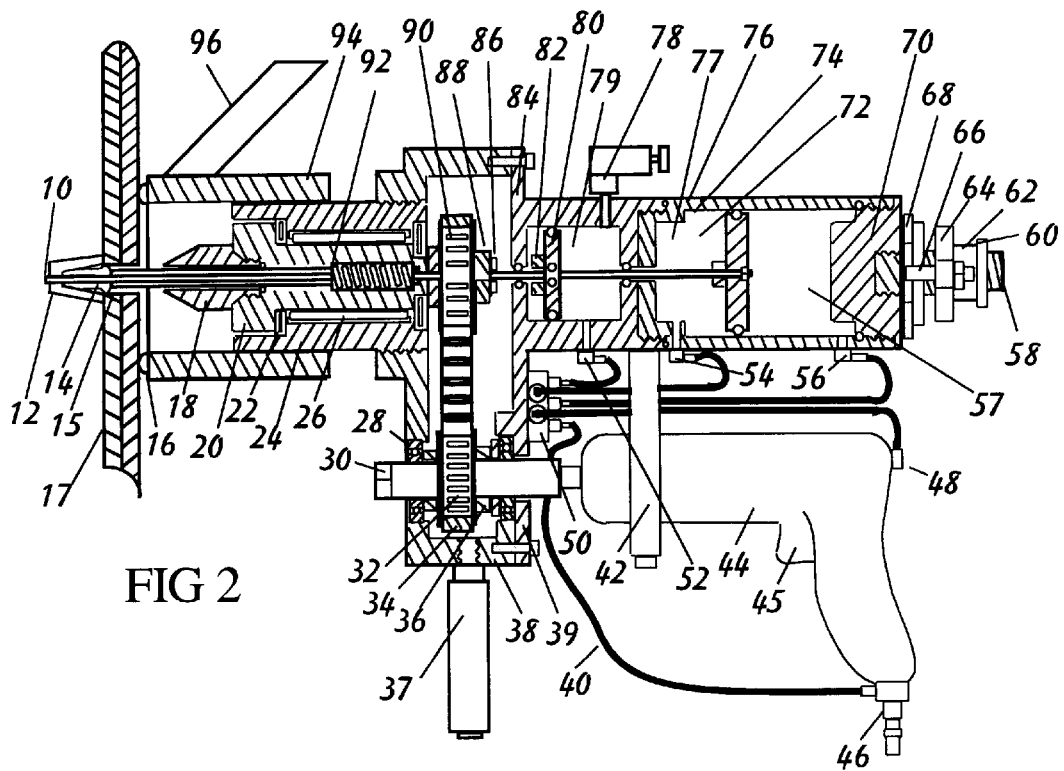
FIG. 2 is a sectional side view showing the tool clamped to the workpiece.

As is best seen in FIG. 2, after the operator inserts the tool into a previously drilled hole 15 in workpiece 17, the tool is ready to countersink. By activating the drill motor trigger 45, air pressure in piston return cylinder 57 is vented off through the air supply fitting 56. The pressure remains in feed rate cylinder 79. The drill motor 44 starts rotating the motor shaft pulley 32 and transferring power by means of the geared belt 34 to the spindle pulley 90 making the spindle 20 and countersink cutter 18 rotate.

Figure 3A:
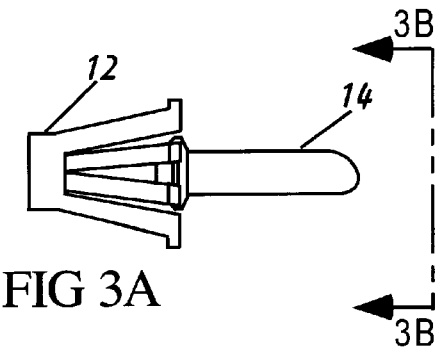
FIG. 3 is an exploded view of the collet and flare tube in its expanded position.
Figure 3B:
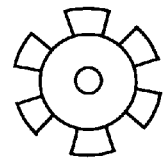

Referring to FIG. 2 and FIG. 3, air pressure is then introduced into power cylinder 77 through air supply fitting 54 by motor air fitting 48. The air pressure moves the body piston 72 in power cylinder 77. Body piston rod 10 is attached to body piston 72 and therefore pulls and expands collet 12 over the flare tube 14. Flare tube 14 is held in position by flare tube spring 92 until collet 12 is fully expanded. Flare tube 14 then compresses flare tube spring 92 until the collet 12 comes in contact with the backside of workpiece 17. Body piston rod 10 continues to pull on the collet 12 because of air pressures action on body piston 72. Four feet 16 are screw attached to nose 94 and react loads acting on the workpiece 7. Any number and configuration of feet 16 may be used. The feet 16 are preferably made from steel. Accordingly, the tool has been clamped to workpiece 17. FIG. 3 is an exploded view, not to scale, of the collet 12, flare tube shaft 14, and the body piston rod 10. The footprint on the right shows six fingers that have been expanded outwardly after the flare tube has passed into the collet 12 to expand them. Body piston rod 10 is cut away. It passes through the center of the flare tube shaft 14 (dotted lines are not shown). The flare tube shaft 14 enlarged portion has a lead of 0.060 inches in length and a diameter that is held to close tolerances that act as a self center feature and is just slight smaller in diameter than the pre-drilled hole 15. The collet is preferably made from spring steel.

Figure 4:
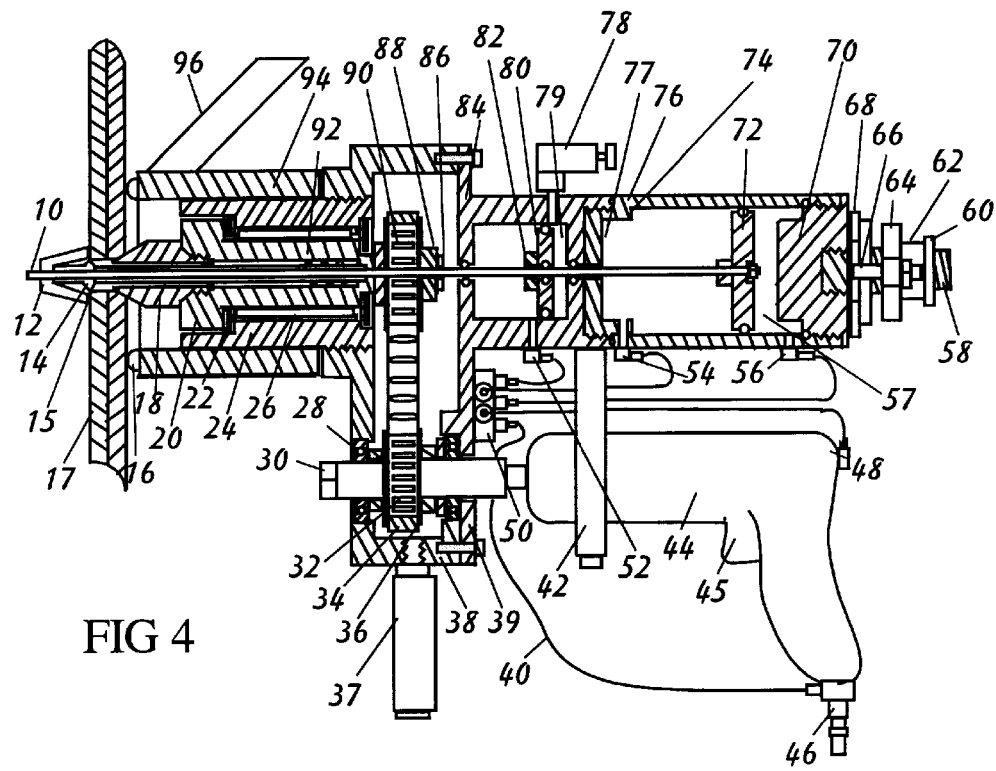
FIG. 4 is a sectional side view showing the countersink engaged in the workpiece.

As is shown in FIG. 4, after body piston 72 has reached its maximum movement, air pressure is applied to the body cylinder 76 forward wall and moves the lower housing 38 and spindle housing 24 into the nose 94, thereby advancing the countersink cutter 18 into the workpiece 17 and cutting the countersink.

Figure 6:
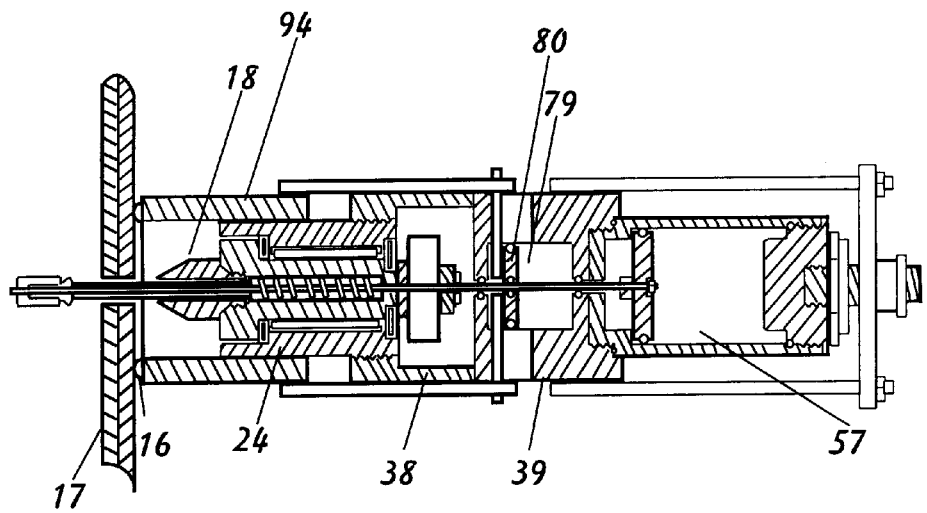
FIG. 6 is a sectional top view of the feed rate cylinder and nose (excluding drive train and attachment/feed mechanism, and valve 78 has been rotated 90° for clarification).
Figure 7:
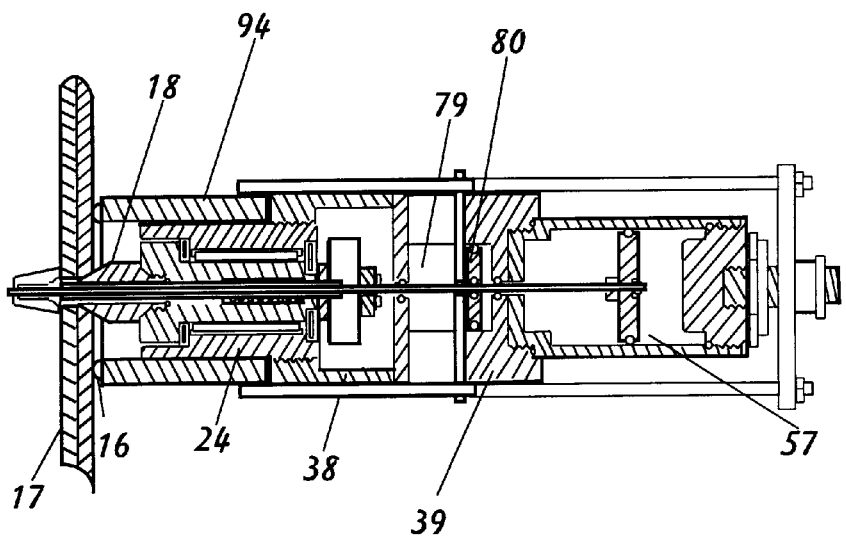
FIG. 7 is a sectional top view of the feed rate cylinder and nose in its full stroke position.

Referring to FIGS. 6 and 7, to control the feed rate of countersink cutter 18, the feed rate piston 80 is held in place by the air pressure in feed rate cylinder 79. If the pressure is not bled off, there will be no movement because of the equalized force in feedrate cylinder 79 and power cylinder 57 (See FIG. 6). Bleed control valve 78 is open to a desired rate of pressure release, thereby reducing pressure in feedrate cylinder 79 and allowing upper housing 39 to move over the feed rate piston 80. When upper housing 39 moves, so does lower housing 38, spindle housing 24, and countersink cutter 18. Thereby the countersink cutter 18 can enter the workpiece at a preset speed. Feedrate speed is variable for different types of workpiece materials. (See FIGS. 6 and 7).

Figure 5:
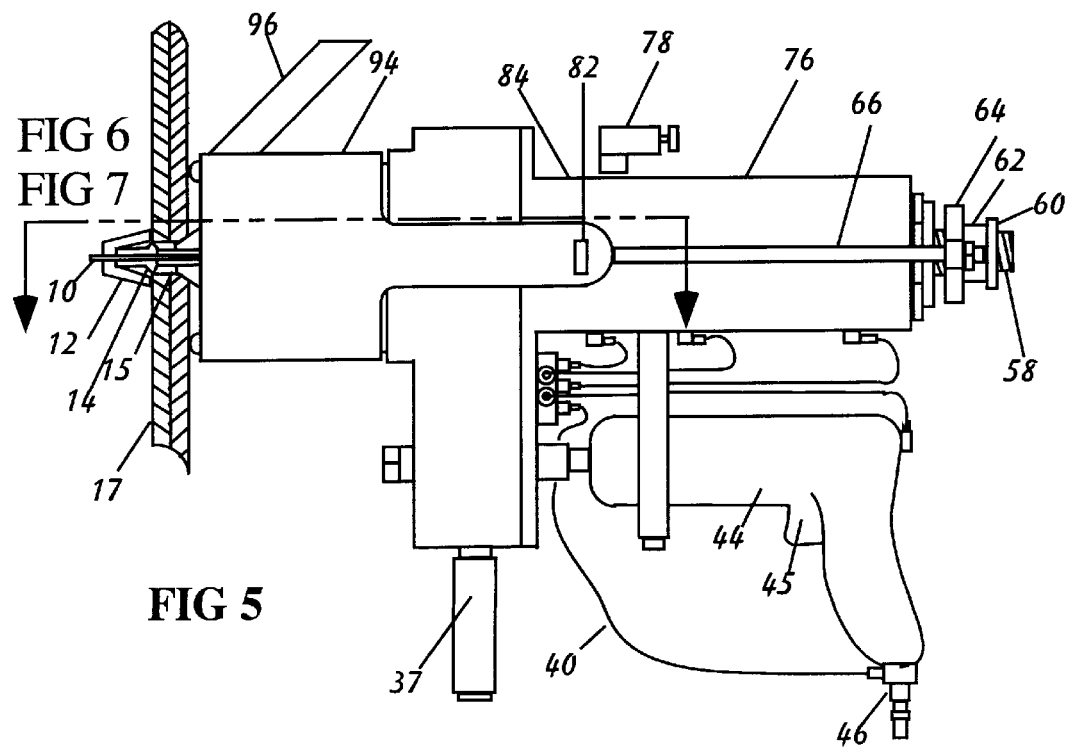
FIG. 5 is a sectional side view showing the mechanical depth stop and sectional cut area for FIG. 6 and FIG. 7.

Referring to FIG. 5, countersink depth is controlled by mechanical means, nose 94 is held against the workpiece 17 and when depth rod 66 contacts nose 94 all movement is stopped. Depth rod 66 is adjustable by the depth set nut 62. Depth crossbar 64 distributes the force of stopping between both sides of nose 94.

The following will illustrate major functions of this tool from start to finish of a countersink, counterbore, or spotface operation. An air line will be attached to a pneumatic power source. The air will pressurize the power cylinder 77 and the piston return cylinder 57. The countersink cutter starts rotating. The worker will insert the countersink tool in a pre-drilled hole and actuate trigger 45. The countersink starts rotating and the piston return cylinder 57 is purged of air pressure. The power cylinder 77 is pressurized and moves body piston 72 aft (to the right as shown) to expand the collet 12 over the flare tube shaft. The flare tube spring 92 holds resistance against the flare tube shaft 14 until there is full collet 12 expansion, and then the flare tube shaft 14 and collet 12 are pulled against the backside of the workpiece 17, thereby collapsing the flare tube spring 92. No further body piston 72 movement can occur because of the mechanical lock up between the tool and the workpiece 17. Further pressurizing of the power cylinder 77 moves the lower housing 38 and spindle housing 24 which contains the countersink cutter 18 through the nose 94 and thereby countersinking the hole. The bleed control valve 78 allows air to escape at a controlled pre-set rate from feedrate cylinder 79 and spindle piston 80 thereby controlling the feedrate advancement of the countersink cutter 18. Countersink depth control is performed by external mechanical stops, including depth set threaded spindle 58, depth lock nut 60, depth set nut 62, depth cross bar 64, depth rod 66 and depth spindle securing nut 68.

For the convenience of the reader, other parts in this blind hole self-collet countersink machine are identified as follows: 22 Spindle Thrust Bearing; 26 Spindle Needle Bearing; 28 Motor Shaft Bearing; 30 Motor Shaft; 36 Motor Shaft Retaining Ring; 37 Balance Handle; 42 Motor Clamp; 56 Air Supply Fitting; 70 Body Plug; 74 Piston Seal; 84 Upper Housing; 86 Spindle Nut; 88 Spacer.

This invention contributes to quality manufacture of parts (e.g. in the wing skins of a commercial aircraft). The invention is automatic and reduces the time required to perform countersink operations by 67% while maintaining higher quality parts. The simple design of the tool is such that maintenance is very easy to perform, as are repairs if any should become needed. Although the description made herein has been of a portable model of the invention, the invention and its concepts are well adapted for use in robotic equipment.

This invention has been recognized as valuable since, so far as known by applicant, there is nothing available in the tooling marketplace which resembles this invention. The closest prior art known to applicant is in the 1954 '887 patent to Rees that was discussed in this patent application.

The applicants tool is regarded as making a very substantial contribution to the manufacturing process in an area of interest to the aircraft industry. Also, other industries may find the tool or various modifications thereof to be useful in their operations.

While preferred embodiments of the invention have been illustrated and described it will be appreciated that various changes can be made therein without departing from the spirit and scope of the invention.

The embodiments of the invention in which an exclusive property or privilege is claimed are defined as follows:

What is claimed is:

1. Manufacturing tool apparatus for countersinking, or the like, a workpiece having a hole drilled therein comprising; means for preventing damage to the backside of said workpiece, such means comprising a collet that expands to its fullest diameter before being drawn up to the backside of the workpiece; the collet in its attachment surrounds the entire hole with equally spaced segmented fingers; a flare tube expands the collet and centers itself within the hole; means for establishing a controlled depth and elimlinating an operator's influence upon the depth by performing this function automatically through power feed apparatus of said countersink; means for establishing the perpendicularly of a countersink with respect to the workpiece; means for clamping up the workpiece to prevent inadvertent relative movement after clamp up between the workpiece and the tool; means for cutting a countersink in an existing hole that is substantially perpendicular to said workpiece; means for countersinking perpendicular to the workpiece despite any misalignment of the pre-drilled hole; and means for controlling countersink feed rate; wherein said tool is automatic and can operate fully without need of any interaction with the workpiece and will cut countersinks that are of precise depth through the use of mechanical depth rods while maintaining perpendicularity to a workpiece wherein said tool requires no action from the operator to activate the collet and flare tube other than to depress the drill motor trigger.

2. The manufacturing tool apparatus for countersinking of claim 1 comprising a fully pneumatic power train.

* * * * *